INVENTOR.
Horace H. Roby

March 22, 1949. H. H. ROBY 2,464,991
HUB ASSEMBLY FOR CONTROLLABLE PITCH PROPELLERS
Filed Sept. 9, 1944 3 Sheets-Sheet 3

INVENTOR.
Horace H. Roby
BY Thos. E. Scofield
ATTORNEY.

Patented Mar. 22, 1949

2,464,991

UNITED STATES PATENT OFFICE 2,464,991

HUB ASSEMBLY FOR CONTROLLABLE PITCH PROPELLERS

Horace H. Roby, Wichita, Kans., assignor, by mesne assignments, to Beech Aircraft Corporation, a corporation of Delaware Application September 9, 1944, Serial No. 553,319

13 Claims. (Cl. 170—160.46)

This invention relates to improvements in hub assemblies for controllable pitch propellers and refers more particularly to a construction which has great strength and ruggedness, one in which engine torque is distributed through its most substantial parts and one which is easily assembled and disassembled thus facilitating servicing, adjustment and repair.

Many different types of hubs for adjusting propeller pitch have been devised, some depending upon hydraulic mechanism and others upon mechanical means. Where the prime movers which drive the propellers are of large horsepower adjustment of pitch is usually done through a power unit while pitch adjustment in the lower horsepower engines is effected manually.

The present invention has two important aspects. First, the manner in which engine torque is transmitted from the drive shaft of the prime mover to the propeller blades which involves the construction of the hub or spider and the housing surrounding the hub. Second, the manner in which pitch adjustment is made and the linkage construction mounted within the hub housing for imposing accurately the same degree of pitch upon the separate blades of the propeller.

In the accompanying drawings, which form a part of the instant specification and are to be read in conjunction therewith and in which like reference numerals are used to indicate like parts in the various views, there is shown an embodiment of the invention.

Transmission of engine torque

In transmitting engine torque from the drive shaft to the propeller blades, particularly in smaller airplanes and with lower horsepower engines where wooden propellers are employed, it is usually desirable to extend an arm or reinforcement member into the ends of the propeller blades. These arms serve to transmit the rotative movement or torque from the shaft to the blades but are objectionable since they reduce the cross section of the blade ends and consequently their strength. As an alternative to this design and without its objectionable features is the one here proposed. This construction by eliminating the arms extending into the blade ends greatly strengthens the joints between the hub and the blades where heavy stresses are applied. To accomplish this it is proposed to form on opposite sides of the hub torque plates which fit against shoulders formed in the hub housing. The ends or extremities of the hub housing which confine the flanges of the propeller blade retention collars and the assembly of the housing and hub are designed to transmit engine torque from the shaft through the hub and housing to the propeller blades instead of through the hub and arms extending from the hub into the ends of the blades.

Figure 1:
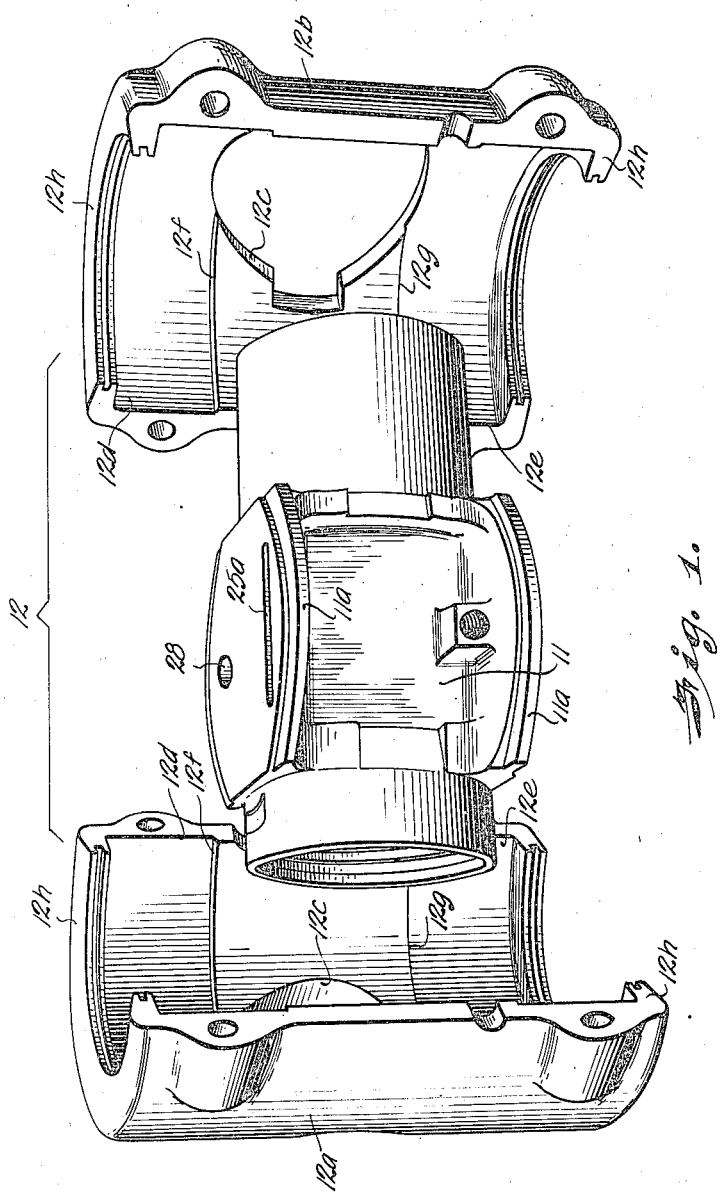
Fig. 1 shows an exploded view of the hub and the hub housing.
Figure 3:
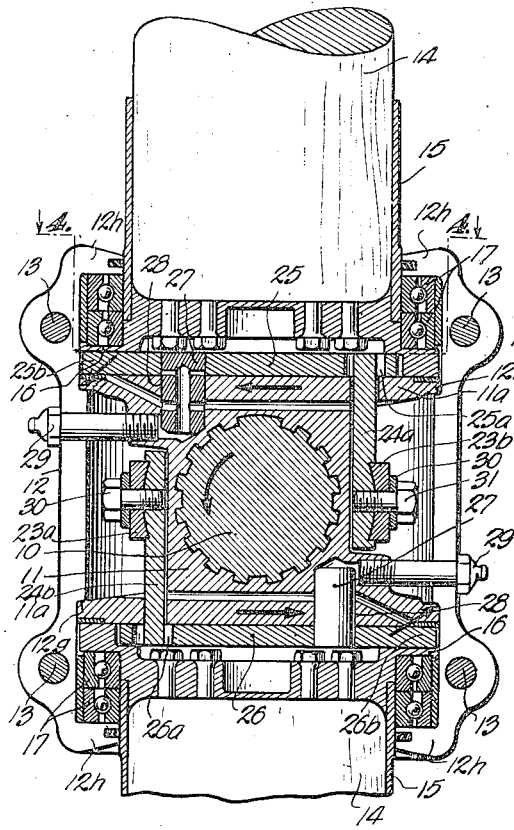
Fig. 3 is a vertical section of the hub taken transversely of the engine shaft.

On the shaft 10, shown in Fig. 3, is fixedly mounted a hub or spider 11. Integrally formed on opposite sides of the hub are torque plates 11a which are circular in form to fit within the hub housing 12, whose separate parts shown in Fig. 1 are designated as 12a and 12b. The circular torque plates are cut away to fit apertures 12c in the sides of the housing. Within the housing shells and located in the upper and lower portions thereof are formed wide grooves 12d and 12e. Shoulders 12f forming the lower edge of the upper groove fit beneath the torque plate 11a. Corresponding shoulders 12g forming the upper edge of grooves 12e fit against the upper edge of the lower torque plate 11a when the parts are fitted together and the hub is in the position shown in Figs. 1 and 3.

As indicated by the heavy arrows shown in Fig. 3, power impulses causing rotation of the engine shaft are transmitted from the shaft 10 to hub 11. When the halves of the housing are closely fit about hub 11 and securely fastened together by bolts 13 the inner edges of the torque plates 11a abut against shoulders 12f and 12g of the housing. Upon rotation of the hub the rotative force is exerted by the hub against the housing at the joint between the inner edges of the torque plates and the shoulders formed in the housing. These joints are indicated by the heavy arrows in Fig. 3.

Figure 2:
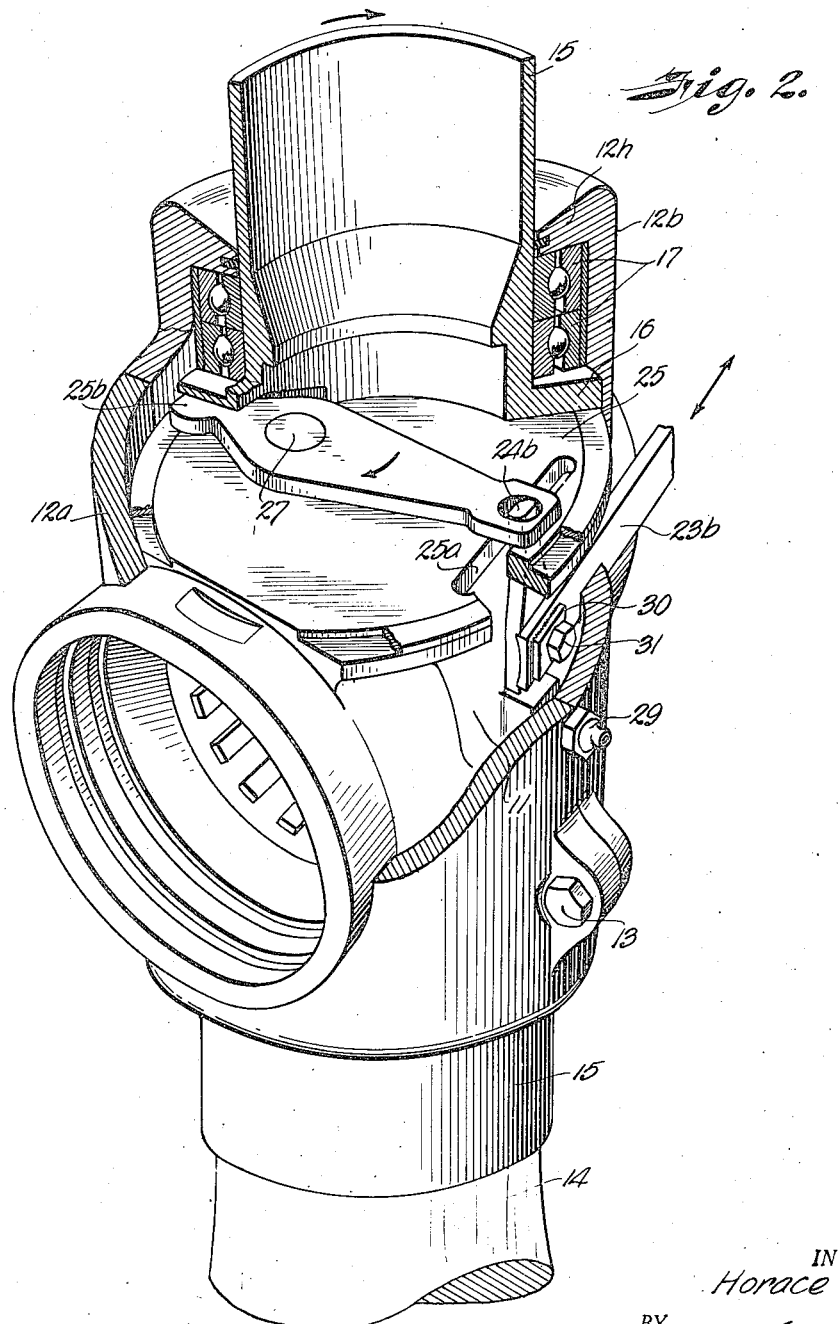
Fig. 2 is a perspective view of the hub assembly with the housing broken away to show the pitch adjustment linkage.

The inner ends 14 of the propeller blades are rigidly fixed within retention collars 15 which terminate within the hub in the form of flanges 16, seen best in Fig. 2. The flanges 16 of the propeller blade retention collars are confined within the housing flanges 12h shown in Figs. 1 and 3. Between the housing flanges 12h and the flanges 16 are thrust bearings 17 which take the centrifugal thrust of the propeller and permit easy adjustment of pitch during rotation of the propeller.

From the foregoing description of the hub, housing and blade mountings it will be seen that the engine torque is transmitted through heavy rugged parts built to withstand the excessive stresses occasioned by transmission of power impulses from the shaft to the propeller blades.

Propeller blade pitch change actuation

Figure 4:
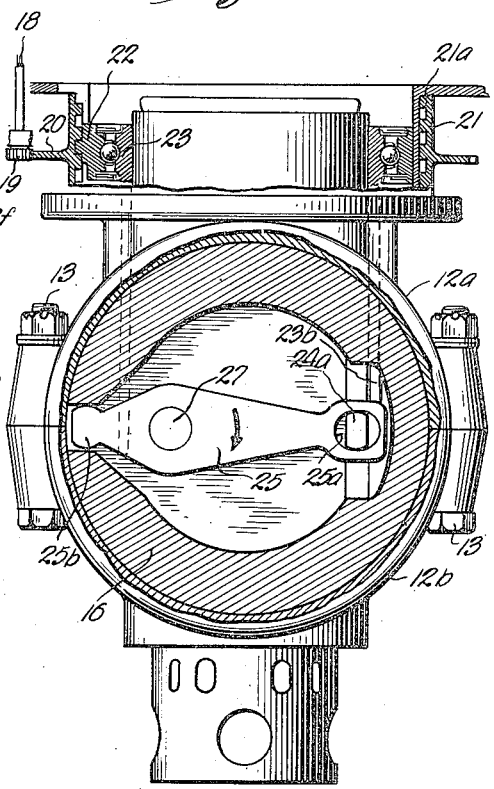
Fig. 4 is a sectional view taken along the line 4—4 in Fig. 3.
Figure 5:
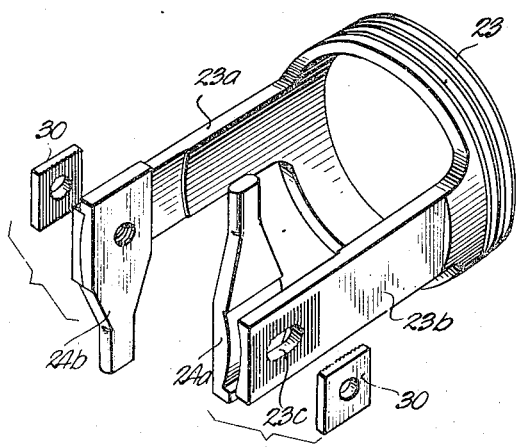
Fig. 5 is a perspective view of the pitch control actuator.

The split housing surrounding the hub permits easy access to the linkage and pitch control mechanism mounted on the hub by means of which the variable degrees of pitch are set upon the blades of the propeller by the pilot. This split housing not only permits servicing, repair and replacement of parts but also facilitates access to the adjustment mechanism for setting the same amount of pitch upon the respective blades of the propeller. To set the desired amount of pitch upon the propeller blades a control device manipulated either by a servomotor or manually by a handle or wheel located on the instrument board or adjacent the pilot's seat rotates a flexible shaft 18, a portion of which is shown in Fig. 4. A pinion 19 mounted at the end of the shaft meshes with the pitch control gear 20. The pitch control gear is carried by a ring 21 which surrounds the shaft and is internally threaded, as shown at 21a in Fig. 4. Meshing with the threads 21a are the external threads cut on the outside of bearing race 22. The inner race 23 of this bearing is a ring which is part of the pitch control actuator shown in Figs. 4 and 5. Extending from the ring 23 are actuator arms 23a and 23b. Near the ends of the arms are slotted apertures 23c. Extending in one direction from the arm 23b is an intermediate link 24a and in an opposite direction from arm 23a is a similar link 24b. The ends of the actuator arms are fitted into the sides of the intermediate links by mortise and tenon joints. The abutting surfaces of the arms and links are arcuate in form to prevent rotative movement of the parts at the joint. The outer extremities of the links fit into apertures 25a and 26a of control arms 25 and 26, as shown in Figs. 2, 3, and 4. The control arms have pivots 27 which fit holes 28 drilled in the torque plats of the hubs. The pivots and the axial movement of the actuator are lubricated by ducts shown in Fig. 3 supplied with lubricant from fittings 29. Oil ducts also lubricate surface contact between the torque plates of the hub and the abutting surfaces of the propeller blade mountings.

On the opposite ends of the pitch control arms from that in which the apertures are formed are rounded heads 25b and 26b. These heads fit into slots formed in the flanges 16 of the propeller blade retention collars 15, best shown in Figs. 2 and 4.

Briefly describing the operation of setting pitch on the propeller blades from the pilot's seat, pinion 19 on shaft 18 is rotated in the desired direction to increase or decrease the pitch of the blades. The internal square threads in the ring 21 of the pitch control gear meshing with the external threads on the outer race 22 moves the pitch control actuator ring 23 axially of the drive shaft. The actuator arms through intermediate links 24a and 24b rotate the pitch control arms 25 and 26 upon their pivots 27 and by engagement of the pitch control arms with the flanges of the blade mountings 16 axial rotation of the blades to the desired amount of pitch results.

Control arm adjustment

To assure that the same amount of pitch is put on each blade of the propeller an adjustment is provided in the linkage at the joint between the actuator arms and the intermediate links. To provide exceedingly small changes or variations in the lengths of the actuator arms and to prevent derangement or disturbance of the joint after the adjustments have been made a unique type of joint construction between the actuator arms and the links is provided. On the outer surface of the actuator arms are a plurality of closely spaced serrations. The space between the serrations is preferably of the order of 0.020 of an inch. Similar serrations are made upon the inner abutting surfaces of lock washers 30, best shown in the exploded view of the actuator in Fig. 5. When the blades of the propeller have been given exactly the same amount of pitch bolts 31 which are threaded into the intermediate links draw the serrated lock washers tightly against the serrated surface of the actuator arms, the meshing serrations preventing axial movement of the links with respect to the arms and the arcuate shape of the joints between the arms and the links preventing rotative movement. As suggested, this construction provides for accurate and exceedingly small changes or increments of pitch upon the respective blades to synchronize each with the other to obtain smooth operation of the propeller with a minimum of vibration. Slight differences in the pitch on the different blades will cause uneven rough operation of the propeller and engine accompanied by objectionable vibration which results in rapid deterioration of the power unit as well as the airplane.

To obtain minute changes in the pitch of the blades it is necessary to shift the position of the intermediate links on the actuator arms. This adjustment is easily made by removing the four bolts 13 which unite the halves of the housing, loosen bolts 31 and shift the links 24a or 24b the desired amount. When the bolts 31 are again tightened and the housing bolts screwed in place the control arm adjustment has been completed. The bolt holes in the actuator arms are slotted to permit this adjustment.

It will be seen that the objects of the invention have been accomplished by furnishing a hub and housing construction through which the engine torque is transmitted and a pitch control linkage readily accessible and easily adjustable for setting the same degree of pitch upon the separate blades of the propeller.

From the foregoing, it will be seen that the invention is one well adapted to attain all of the ends and objects hereinbefore set forth together with other advantages which are obvious and which are inherent to the structure.

As many possible embodiments may be made of the invention without departing from the scope thereof it is to be understood that all matter herein set forth or shown in the drawings is to be interpreted as illustrative and not in a limiting sense.

Having thus described my invention I claim:

1. A controllable pitch propeller, comprising a hub fixedly attached to the drive shaft of an engine, a tubular housing surrounding said hub with its axis transverse to the axis of the shaft, a pair of propeller blades projecting from opposite ends of said housing each connected to the housing, a substantially disk-shaped torque plate on said hub disposed normal to the axis of said tubular housing and spaced from the axis of the hub, the edge of said plate abutting the inner wall of said tubular housing whereby the engine torque is transmitted from the drive shaft to the propeller blades through said torque plate.

2. A hub assembly as in claim 1 wherein said tubular housing comprises a pair of generally semi-cylindrical shells rigidly fastened together so they encircle the disk-like torque plate.

3. A controllable pitch propeller, comprising a hub fixedly attached to the drive shaft of an engine, propeller blades, a housing having sockets for receiving and retaining the inner ends of the propeller blades, substantially disk-shaped torque plates on said hub, each plate positioned adjacent the end of one of said propeller blades and having its peripheral edge adapted to engage the inner wall of the associated blade-retaining socket whereby the engine torque is transmitted to the blades through said plates.

4. A hub assembly as in claim 3 having a pitch control lever pivotally mounted on each torque plate between that plate and the butt of the adjacent propeller blade, a pitch control actuator common to said levers carried by the drive shaft and movable axially thereof, each of said levers having one end connected to said common actuator and the other end connected to the associated individual propeller blade.

5. A controllable pitch propeller comprising a hub fixedly attached to an engine drive shaft, a housing surrounding the hub, propeller blades extending outwardly from the housing and connected at their inner ends to the housing, torque plates on the hub beneath the inner ends of the respective propeller blades and substantially corresponding in shape with the cross section of the inner ends of the blades, shoulder abutments on the interior wall of the housing, the edges of the torque plates engaging said shoulder abutments whereby engine torque is transmitted from the drive shaft to the propeller blades.

6. A controllable pitch propeller comprising a hub fixedly attached to an engine drive shaft, a housing surrounding the hub, said housing comprising a plurality of separable parts, shoulder abutments on the inner wall of said housing parts, propeller blades connected at their inner ends to the housing, torque plates on the hub beneath the inner ends of the propeller blades and substantially corresponding in shape with the inner ends of the blades, the edges of the torque plates engaging said shoulders within the housing parts, whereby engine torque is transmitted from the shaft to the propeller blades.

7. A controllable pitch propeller comprising a hub fixedly attached to an engine drive shaft, a housing surrounding the hub, propeller blades connected at their inner ends to the housing, torque plates formed on and unitary with the hub beneath the inner ends of the propeller blades and having a shape corresponding substantially with the cross section of the hub ends of the blades, shoulder abutments on the interior wall of the housing, the edges of the torque plates engaging said shoulders whereby engine torque is transmitted from the shaft to the propeller blades.

8. A controllable pitch propeller comprising a hub fixedly attached to an engine drive shaft, a housing surrounding the hub, said housing comprising a plurality of separable parts, shoulder abutments on the inner wall of said housing parts, propeller blades connected at their inner ends to the housing, torque plates having a shape corresponding substantially with the cross section of the hub ends of the blades formed on and unitary with the hub beneath the inner ends of the propeller blades, the edges of the torque plates engaging said shoulders on the housing parts whereby engine torque is transmitted from the shaft to the propeller blade.

9. A controllable pitch propeller comprising a hub fixedly attached to an engine drive shaft, propeller blades having their inner ends adjacent the hub, slotted torque plates beneath the inner ends of the blades, a pitch control actuator having arms embracing the hub and extending through the slots in the torque plates, said actuator carried by the drive shaft and movable axially thereof, separate control arms corresponding in number to the blades of the propeller pivoted on the torque plates of the hub, each of said arms having one end operably connected through the torque plate slots to an actuator arm and having the other end connected to the base of a propeller blade.

10. A controllable pitch propeller comprising a hub fixedly attached to the drive shaft of an engine, a housing surrounding the hub, said housing comprising a plurality of separable parts, shoulder abutments on the inner wall of said housing parts, propeller blades connected at their inner ends to the housing, torque plates on the hub beneath the inner ends of the blades and substantially corresponding in shape with the inner ends of the blades, the edges of the torque plates of the hub engaging said shoulders on the housing parts, a pitch control actuator having arms embracing the hub, said actuator carried by the drive shaft and movable axially thereof, separate control arms pivoted on the torque plates of the hub, each of said arms operably connected to an actuator arm at one end and the base of the propeller blade at the other.

11. A controllable pitch propeller comprising a hub attached to the drive shaft of an engine, a housing surrounding the hub, shoulder abutments on the interior wall of the housing, propeller blades connected at their inner ends to the housing, torque plates on the hub beneath the inner ends of the propeller blades, the edges of the torque plates engaging said shoulders within the housing, a pitch control actuator mounted on the drive shaft and movable axially thereof, said actuator having arms embracing the hub, serrated surfaces on the actuator arms, control arms corresponding in number to the blades of the propeller pivoted on the torque plates, each control arm operably connected to the base of a propeller blade at one end and to an actuator arm at the other, the connections between the control arms and actuator arms having serrated surfaces engaging the serrated surfaces of the actuator arms and adapted to facilitate accurate and immovable adjustment between the members.

12. A controllable pitch propeller comprising a hub fixedly attached to the drive shaft of an engine, a housing surrounding the hub, said housing comprising a plurality of separable parts, shoulder abutments on the inner wall of said housing parts, propeller blades connected at their inner ends to the housing, torque plates on the hub beneath the inner ends of the propeller blades, the edges of the torque plates engaging the shoulders within the housing parts, a pitch control actuator mounted on the drive shaft and movable axially thereof, said actuator having arms embracing the hub, serrated surfaces on the actuator arms, control arms corresponding in number to the propeller blades and torque plates, each control arm operably connected to the base of a propeller blade at one end and to an actuator arm at the other, the connections between the control arms and actuator arms having serrated surfaces engaging the serrated surfaces of the actuator arms and adapted to facilitate accurate and immovable adjustment between the members.

13. A controllable pitch propeller comprising propeller blades, a hub fixedly attached to the drive shaft of an engine and having torque plates beneath the inner ends of the propeller blades, a housing securing the inner ends of the propeller blades and fixedly connected to the hub by said torque plates whereby the hub and housing transmit engine torque from the drive shaft to the propeller blades, a pitch control actuator having arms embracing the hub, said actuator carried by the drive shaft and movable axially thereof, serrated surfaces on the actuator arms, control arms corresponding in number to the propeller blades pivoted on the torque plates of the hub and each operably connected at one end to a propeller blade and at the other end to an actuator arm, the connection with the actuator arms having serrated surfaces engaging the serrated surfaces of the actuator arms and adapted to facilitate accurate and immovable adjustment between the members.

H. H. ROBY.

REFERENCES CITED

The following references are of record in the file of this patent:

UNITED STATES PATENTS

| Number | Name | Date |
|---|---|---|
| 2,281,456 | Roby | Apr. 28, 1942 |
| 2,347,282 | Roby | Apr. 25, 1944 |